(12) United States Patent
Jeon et al.

(10) Patent No.: US 12,512,565 B2
(45) Date of Patent: Dec. 30, 2025

(54) BATTERY SYSTEM

(71) Applicant: SK INNOVATION CO., LTD., Seoul (KR)

(72) Inventors: Hae Ryong Jeon, Daejeon (KR); Sun Mo An, Daejeon (KR); Young Sun Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 17/086,771

(22) Filed: Nov. 2, 2020

(65) Prior Publication Data
US 2021/0135182 A1 May 6, 2021

(30) Foreign Application Priority Data
Nov. 1, 2019 (KR) .......... 10-2019-0138688

(51) Int. Cl.
*H01M 50/543* (2021.01)
*H01M 50/502* (2021.01)
*H01M 50/54* (2021.01)

(52) U.S. Cl.
CPC ....... *H01M 50/543* (2021.01); *H01M 50/502* (2021.01); *H01M 50/54* (2021.01)

(58) Field of Classification Search
CPC ... H01M 50/543; H01M 50/502; H01M 50/54
See application file for complete search history.

(56) References Cited

U.S. PATENT DOCUMENTS

| 2003/0143458 A1* | 7/2003 | Asahina | H01M 50/533 429/153 |
| 2013/0034771 A1* | 2/2013 | Delans | H01M 50/548 429/158 |

(Continued)

FOREIGN PATENT DOCUMENTS

| CN | 1409423 A | 4/2003 |
| CN | 1437277 A | 8/2003 |

(Continued)

OTHER PUBLICATIONS

Espacenet machine translation of KR-2019091049-A (Year: 2019).*

(Continued)

*Primary Examiner* — Susan D Leong
(74) *Attorney, Agent, or Firm* — IP & T GROUP LLP

(57) ABSTRACT

A battery system includes a plurality of battery modules including battery cells in which electrode tabs having different polarities are formed at both ends thereof, wherein a plurality of battery cells are stacked. The plurality of battery modules includes: a first terminal having a first positive electrode terminal and a first negative electrode terminal, which are formed by connecting electrode tabs located at one end of the battery cells to each other among the plurality of electrode tabs; and a second terminal having a second positive electrode terminal and a second negative electrode terminal, which are formed by connecting electrode tabs located at the other end of the battery cells to each other among the plurality of electrode tabs. The first and second terminals of any one battery module of the plurality of battery modules are arranged to be electrically connected with the first and second terminals of battery modules adjacent to the any one battery module.

10 Claims, 6 Drawing Sheets

(56) References Cited

U.S. PATENT DOCUMENTS

| | | | | |
|---|---|---|---|---|
| 2013/0260213 A1* | 10/2013 | Takahashi | ........... | H01M 50/204 |
| | | | | 429/159 |
| 2014/0030579 A1* | 1/2014 | Kim | ................... | H01M 50/533 |
| | | | | 429/153 |
| 2014/0212722 A1* | 7/2014 | Lee | .................... | H01M 50/502 |
| | | | | 429/99 |
| 2019/0036093 A1* | 1/2019 | Mueller | .............. | H01M 50/209 |
| 2020/0176739 A1* | 6/2020 | You | ....................... | H01M 50/20 |
| 2022/0238962 A1* | 7/2022 | He | ........................ | H01M 50/24 |

FOREIGN PATENT DOCUMENTS

| | | | | | |
|---|---|---|---|---|---|
| CN | 202034451 | U | | 11/2011 | |
| CN | 103098285 | A | | 5/2013 | |
| CN | 107919446 | A | | 4/2018 | |
| CN | 208352420 | U | | 1/2019 | |
| CN | 208959324 | U | | 6/2019 | |
| CN | 209150238 | U | | 7/2019 | |
| CN | 110364675 | A | * | 10/2019 | |
| JP | 2012054197 | A | * | 3/2012 | |
| KR | 10-2013-0063890 | A | | 6/2013 | |
| KR | 20140019951 | A | | 2/2014 | |
| KR | 10-2016-0087220 | A | | 7/2016 | |
| KR | 10-2016-0131627 | A | | 11/2016 | |
| KR | 10-2017-0011349 | A | | 2/2017 | |
| KR | 10-2019-0091049 | A | | 8/2019 | |
| KR | 2019091049 | A | * | 8/2019 | ............ H01M 50/20 |
| WO | WO-2013047399 | A1 | * | 4/2013 | .......... B60L 11/1864 |

OTHER PUBLICATIONS

Espacenet machine translation of JP2012054197A (Year: 2012).*
Espacenet machine translation of WO-2013047399-A1 (Year: 2013).*
First Office Action issued for the Chinese Patent Application 202011204197.2 issued by the Chinese Patent Office on Jun. 21, 2023.
Notice of Allowance for the Chinese Patent Application No. 202011204197.2 issued by the Chinese Patent Office on Nov. 23, 2023.
Office Action for Korean Patent Application No. 10-2019-0138688 issued by the Korean Patent Office on Jan. 13, 2025.

* cited by examiner

BATTERY SYSTEM

CROSS-REFERENCE TO RELATED APPLICATION

This application claims priority to Korean Patent Applications No. 10-2019-0138688 filed on Nov. 1, 2019 in the Korean Intellectual Property Office, the entire disclosure of which is incorporated by reference herein.

BACKGROUND OF THE INVENTION

1. Field of the Invention

The present invention relates to a battery system, and more specifically, to a battery system having an improved structure.

2. Description of the Related Art

As alternative plans to solve problems of air pollution with the existing gasoline vehicle, diesel vehicle, and the like using fossil fuels, a secondary battery has been drawn as a power source for an electric vehicle (EV), a hybrid electric vehicle (HEV) and the like.

Meanwhile, in order to load the secondary battery in the vehicle, it is required to improve an energy density and solve a problem entailed is spatial constraints. As a means for achieving the requirements, a long-width battery cell having a much longer edge length between electrode tabs than an edge, in which the electrode tabs are located, has been proposed. A general battery cell has a width of 300 mm or less, whereas the long-width battery cell has a width of 600 mm, and an ultra-long-width battery cell is designed to have a width of 600 mm or more.

However, the long-width or ultra-long-width battery cell has a problem that the length between the electrode tabs is increased and an internal resistance of the cell also is increased, thereby causing a large loss of power. In addition, since a difference in the temperature of each region of the battery cell is large, there are problems that the performance of the battery cell is deteriorated and the lifespan thereof is also reduced, and it may be accompanied by a problem that the ultra-long-width battery cell is bent due to its own weight.

Therefore, in order to commercialize a battery module including the ultra-long-width battery cell, it is necessary to provide an alternative idea for an electrical structure capable of reducing the internal resistance of the cell, a cooling system capable of solving the heat generation problem, and an assembly structure capable of improving structural stability.

SUMMARY OF THE INVENTION

It is an object of an aspect of the present invention to provide a battery system in which a connection structure of a plurality of battery modules is improved.

Another object of an aspect of the present invention to provide a battery system having an improved space efficiency.

To achieve the above objects, according to an aspect of the present invention, there is provided a battery system including: a plurality of battery modules including battery cells in which electrode tabs having different polarities are formed at both ends thereof, wherein a plurality of battery cells are stacked, wherein the plurality of battery modules may include: a first terminal having a first positive electrode terminal and a first negative electrode terminal, which are formed by connecting electrode tabs located at one end of the battery cells to each other among the plurality of electrode tabs; and a second terminal having a second positive electrode terminal and a second negative electrode terminal, which are formed by connecting electrode tabs located at the other end of the battery cells to each other among the plurality of electrode tabs, wherein the first and second terminals of any one battery module of the plurality of battery modules are arranged to be electrically connected with the first and second terminals of battery modules adjacent to the any one battery module.

First and second positive electrode terminals of a first battery module among the plurality of battery modules may be respectively connected to first and second negative electrode terminals of a second battery module adjacent to the first battery module, and first and second positive electrode terminals of the second battery module may be respectively connected to first and second negative electrode terminals of a third battery module adjacent to the second battery module.

The first and second terminals may be configured to operate independently.

The first and second positive electrode terminals and the first and second negative electrode terminals may be configured so that terminals having the same polarity are disposed on the same side in a length direction of the battery module.

The plurality of battery modules may be configured so that polarities of the first and second terminals are alternately arranged in an arrangement direction of the plurality of battery modules.

The plurality of battery modules may include: a first bus bar assembly having first bus bars to which the electrode tabs located at one end of the battery cells are connected among the plurality of electrode tabs, and a first terminal plate which is electrically connected to the first bus bars to form the first positive electrode terminal and the first negative electrode terminal; and a second bus bar assembly having second bus bars to which the electrode tabs located at the other end of the battery cells are connected among the plurality of electrode tabs, and a second terminal plate which is electrically connected to the second bus bars to form the second positive electrode terminal and the second negative electrode terminal.

The first and second bus bar assemblies may be located at one end and the other end of the battery module, respectively.

The plurality of battery modules may be formed to have a smaller width in a width direction perpendicular to the length direction than a length in the length direction running from the first terminal to the second terminal.

The plurality of battery cells may be disposed to be stacked in the width direction.

According to an aspect of the present invention, energy density may be maximized by improving the cell structure and the arrangement structure of the battery system.

According to an aspect of the present invention, it is possible to minimize an internal resistance of the battery system and maximize a cooling performance of the module.

According to an aspect of the present invention, by improving the terminal connection structure of the battery system, it is possible to improve the performance of the battery module and minimize the electrical connection length between the battery modules.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
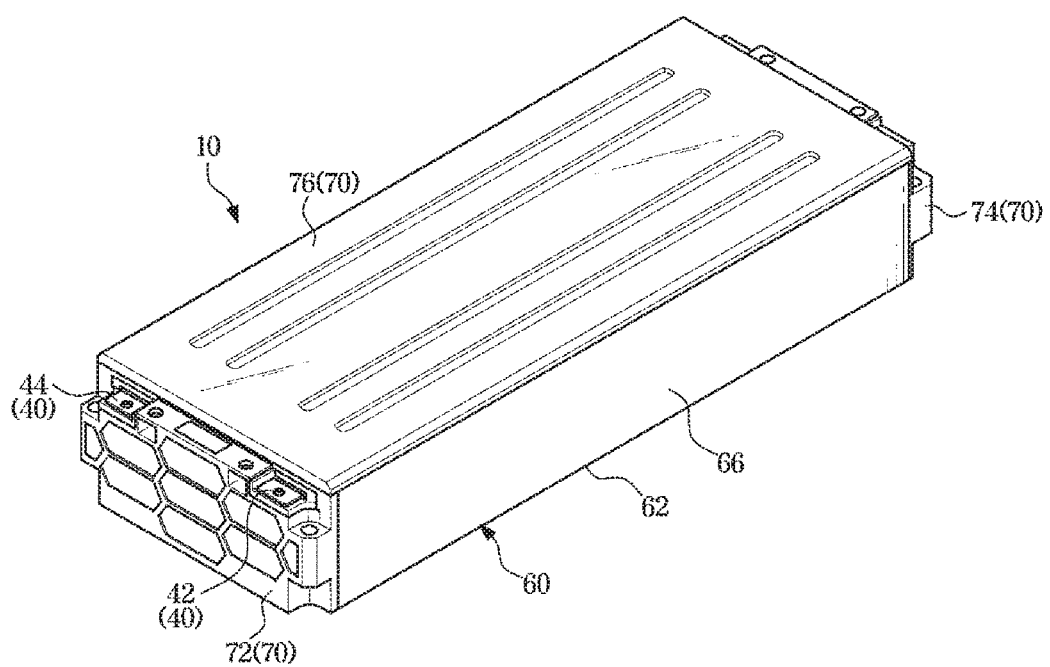
FIG. 1 is a perspective view of a battery module in a battery system according to an embodiment of the present invention.

Configurations illustrated in the embodiments and drawings of the present disclosure are only preferred examples of the invention, and diverse modifications capable of replacing the embodiments and drawings of the present disclosure may be possible at a time of filing the present application.

Further, the same reference numerals or symbols in the drawings of the present disclosure will represent parts or components having substantially the same functions.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, the terms including numerals such as "first," "second," etc. in the present disclosure may be used to explain different components, but such components are not limited thereto. These terms are used only to distinguish one component from other components. For example, a first component, may also be named a second component without departing from the scope of the present invention. Likewise, the second component may also be named the first component. The term "and/or" may include a combination of a plurality of related items and/or any one among the plurality of related items.

In addition, the terms such as a "part," "device," "block," "member," "module," and the like may refer to a unit to execute at least one function or operation. For example, the terms may refer to at least one hardware such as a field-programmable gate array (FPGA) or an application specific integrated circuit (ASIC), at least one operating process performed by at least one software stored in a memory or processor.

Hereinafter, embodiments according to the present invention will be described in detail with reference to the accompanying drawings.

Figure 2:
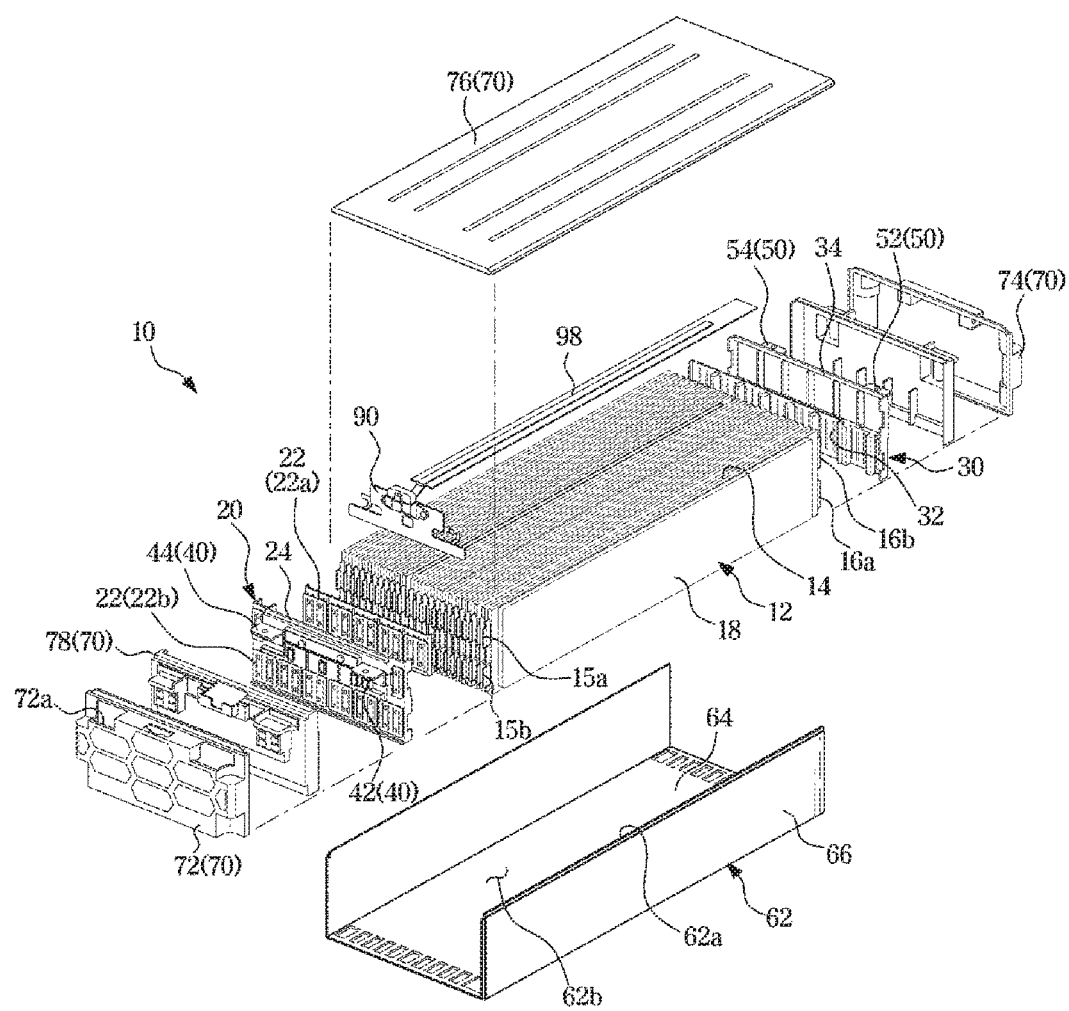
FIG. 2 is an exploded perspective view of the battery module in the battery system according to an embodiment of the present invention.

FIG. 1 is a perspective view of a battery module in a battery system according to an embodiment of the present invention, and FIG. 2 is an exploded perspective view of a battery module in a battery system according to an embodiment of the present invention.

A battery system 1 (see FIGS. 6 and 7) may include a plurality of battery modules 10.

A battery module 10 may include a battery stack 12 in which pouch battery cells 14 are stacked, and bus bar assemblies 20 and 30 which electrically connect the battery cells 14 forming the battery stack 12 to each other, and a module case 60 which houses and protects the battery stack 12 and bus bars 22 and 33.

The battery stack 12 formed by stacking the battery cells 14 will be described in detail below.

The bus bar assemblies 20 and 30 may include the bus bars 22 and 32 and terminal plates 24 and 34.

The bus bars 22 and 32 are formed at both ends of the battery stack 12, and may electrically connect electrode tabs 15a, 15b, 16a and 16b of the plurality of battery cells 14 to each other.

The bus bars 22 and 32 may be coupled to one end and the other end of the battery stack 12, respectively, such that each pair of electrode tabs 15a, 15b, 16a, and 16b respectively formed at both ends of the battery cell 14 may be electrically connected to each other.

The terminal plates and 34 are provided to be electrically connected with the bus bars 22 and 32, and form terminals 40 and 50 which are exposed to an outside. The terminal plates 24 and 34 connected with the bus bars 22 and 32 may form a first positive electrode terminal 42 and a first negative electrode terminal 44 at one end of the battery stack 12, and a second positive electrode terminal 52 and a second negative electrode terminal 54 at the other end of the battery stack 12. The first positive electrode terminal 42 and the first negative electrode terminal 44 may be defined as a first terminal 40, and the second positive electrode terminal 52 and the second negative electrode terminal 54 may be defined as a second terminal 50. That is, the first positive electrode terminal 42 and the first negative electrode terminal 41 provided at one end of the battery module 10 may be referred to as the first terminal 40, and the second positive electrode terminal 52 and the second negative electrode terminal 54 provided at the other end of the battery module 10 may be referred to as the second terminal 50, respectively. The first and second positive electrode terminals 12 and 52; and the first and second negative electrode terminals 44 and 54 are configured so that terminals having the same polarity are disposed on the same side in a length direction of the battery module 10. That is, the first and second positive electrode terminals 42 and 52; and the first and second negative electrode terminals 44 and 54 may be symmetrically disposed on both ends of the battery module 10. When the positive electrode terminals 42 and 52 are disposed close to one side of the battery module 10, the negative electrode terminals 44 and 54 may be disposed close to the other side of the battery module 10.

The battery module 10 may be formed to have a smaller width in a width direction perpendicular to the length direction than a length in the length direction running from the first terminal 40 to the second terminal 50. In the present embodiment, the battery modules 10 having a length longer than the width and including a positive electrode terminal and a negative electrode terminal disposed at both ends thereof may be applied to the battery system 1.

The terminal plates 24 and 34 may be provided to be coupled to the bus bars 22 and 32 in a separate configuration, or may be integrally formed therewith. In the present embodiment, it is illustrated that the bus bar 22 is divided into an upper bus bar 22a and a lower bus bar 22b, wherein the upper bus bar 22a is disposed on a surface of the terminal plate 24 facing the battery stack 12, and the lower bus bar 22b is disposed on a front surface of each of the terminal plates 24 and 34. However, it is not limited thereto. Any configuration may be used so long as it satisfies that the bus bars 22 and 32 electrically connect a plurality of electrode tabs 15a, 15b, 16a and 16b to each other, and the terminal plates 24 and 34 are electrically connected to the bus bars 22 and 32 to form the positive electrode terminals 42 and 52 and the negative electrode terminals 44 and 54.

The module case 60 may form an appearance of the battery module 10. The module case 60 may include a case body 62 forming a placing space 62b, and a case cover 70 coupled to the case body 62. The case body 62 may include an opening 62a communicating with the placing space 62b, and the case cover 70 may be configured to cover the opening 62a. The case cover 70 may include a front cover 72 and a rear cover 74 coupled to the front and rear of the case body 62, and an upper cover 76 coupled to an upper portion of the case body 62.

The front and rear covers 72 and 74 may be configured to be coupled to the outside of the terminal plates 24 and 34, thus to cover the terminal plates 24 and 34, respectively. The case cover 70 may further include an insulation cover 78 disposed between the front and rear covers 72 and 74 and the terminal plates 24 and 34. The insulation cover 78 may be made of an insulation material. The front and rear covers 74 may include opening portions 72a which are opened so that the terminals are exposed to the outside. The positive electrode terminals 42 and 52 and the negative electrode terminals 44 and 54 formed in the terminal plates 24 and 34 may be exposed to the outside of the front and rear covers 74 through the opening portions 72a.

The case body 62 may include a lower case 64 forming a bottom surface, and side cases 66 extending from the lower case 64 to form side surfaces. In the present embodiment, the case body 62 has a cross-section in a shape of a "U" and is provided so that the front and rear sides and an upper portion thereof are opened. However, it is not limited thereto, and the case body 62 may be provided to have a 'square-shaped' cross section, and the front and rear sides thereof are opened. Any structure may be used so long as it satisfies that the case body 62 forms the placing space 62b in which a plurality of battery cells 14 are placed. The battery stack 12 may include a buffer member 18 which is disposed on the outermost side thereof, and is disposed between an inner surface of the side case 66 and the battery cell 14 at the outermost side thereof to function as a buffer.

The case body 62 and the case cover 70 may protect the respective components, which are electrically connected to each other, such as the battery stack 12, the bus bars 22 and 32, and the terminals in the battery module 10.

The battery module 10 may include a sensing unit 90.

The plurality of battery cells 14 are electrically connected to each other, and states of the connected battery cells 14 should be monitored. The sensing unit 90 may detect the states of the battery cells 14. The states of the battery cells 14 detected by the sensing unit 90 may include various information including temperature information as well as a voltage state. The sensing unit 90 is connected to a temperature sensor 98 disposed inside the battery module 10 to monitor the temperature information of the battery cells 14.

Figure 4:
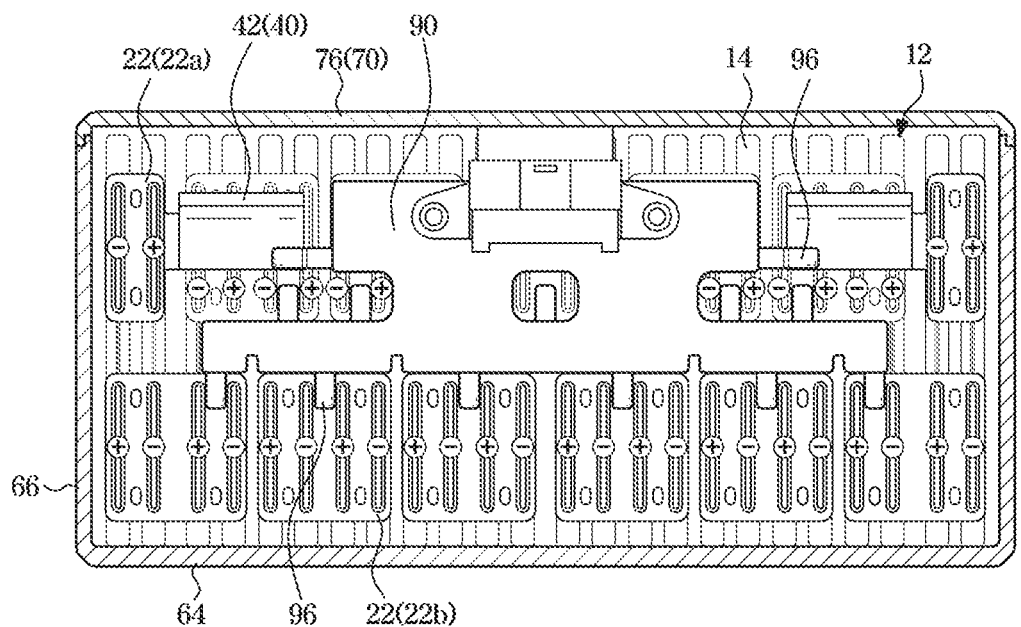
FIG. 4 is a front view of the battery module in the battery system according to an embodiment of the present invention.

As shown in FIG. 4, the sensing unit 90 may be connected to the battery cells 14 through the bus bars 22 and 32, rather than directly connecting thereto. However, it is not limited thereto, and the sensing unit 90 may be configured to be directly connected to the battery cell 14. The sensing unit 90 may include a plurality of connection parts 96 disposed along the peripheries of the bus bars 22 and 32 so as to be electrically connected thereto.

The battery module 10 may include a cooling member (not illustrated). The cooling member is not illustrated in the drawings, but may be disposed to cover the case body 62 and toe case cover 70. Through this, cooling of the battery cell 14 may be performed in multiple directions. In the present embodiment, since the first and second terminals 40 and 50 independently operate in the battery module, a separate configuration for electrically connecting the first and second terminals 40 and 50 may be omitted. Through this configuration, it is possible to freely set the arrangement of the cooling member with respect to the battery module. For example, a cooling member may be disposed around the battery module 10 located between the first and second terminals 40 and 50, that is, on at least one of the lower case, the side case and the upper cover, and the cooling members may be disposed on all the lower case, the side case and the upper cover. The cooling member may be formed in surface contact with at least one of the lower case, the side case and the upper cover.

Figure 3:
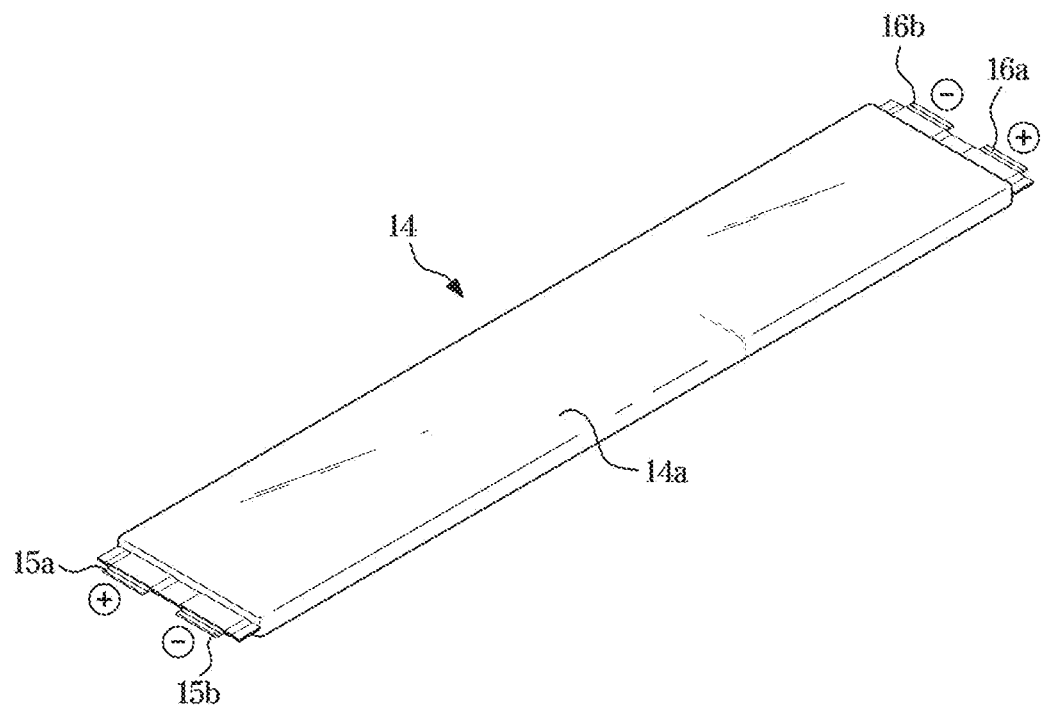
FIG. 3 is a perspective view of a battery cell in the battery system according to an embodiment of the present invention.
Figure 5:
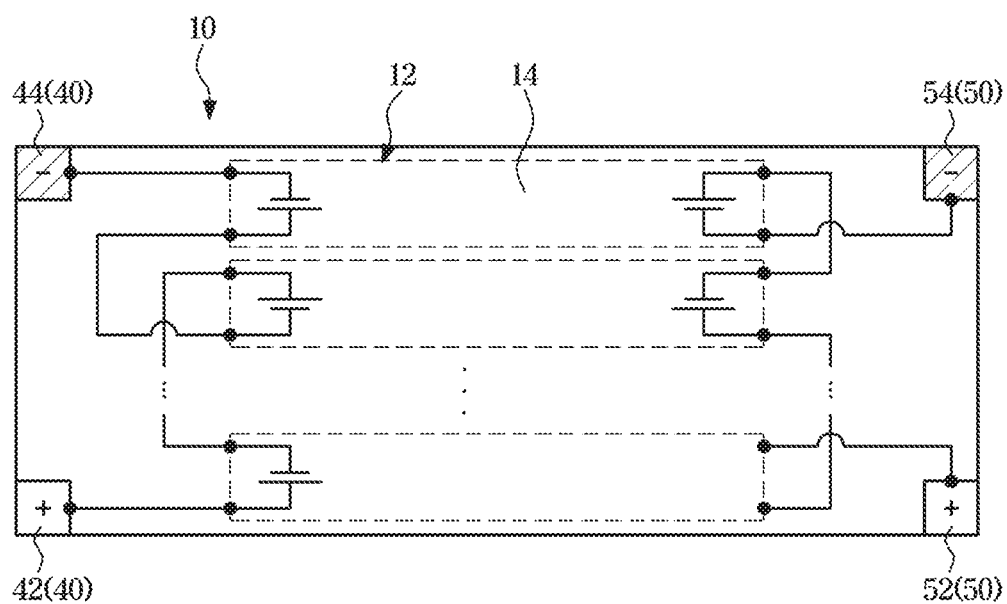
FIG. 5 is a diagram schematically illustrating the battery module in the battery system according to an embodiment of the present invention.

FIG. 3 is a perspective view of a battery cell in the battery system according to an embodiment of the present invention, FIG. 4 is a front view of the battery module in the battery system according to an embodiment of the present invention, and FIG. 5 is a diagram schematically illustrating the battery module in the battery system according to an embodiment of the present invention.

The battery cell 14 may be formed in a long width or ultra-long width in which an edge length between the electrode tabs in the length direction is much longer than a length of the edge where the electrode tabs 15a, 15b, 16a, and 16b are located.

The battery cells 14 may include an electrode assembly (not illustrated) from which the electrode tabs 15a, 15b, 16a, and 16b are drawn out, and an exterior material 14a for housing the electrode assembly. The electrode assembly may be formed in a wound type in which one or more of positive electrode plates and negative electrode plates are wound together with a separator, or a stack type in which a plurality of positive electrode plates and a plurality of negative electrode plates are alternately stacked with the separator interposed therebetween. The exterior material 14a is configured in a form including an outer insulation layer, a metal layer, and an inner adhesive layer, and may house internal components such as an electrode assembly and an electrolyte.

In a case of a structure in which the electrode tabs are formed one by one at both ends of the battery cell 14, if the width of the battery cell 14 is increased, the length between the electrode tabs in the width direction is also increased, thereby causing an increase in an internal resistance of the battery cell 14. In addition, when the positive electrode tab and negative electrode tab are arranged and activated only at one end of the battery cell 14, a current density in a specific region of the one end having the activated electrode tabs is increased, such that the specific region of the battery cell 14 is overheated compared to other regions, and the current density is increased. Thereby, a problem, in which a surface pressure is increased and dendrite is formed, may occur.

To this end, the battery cell 14 in the present invention may include a first positive electrode tab 15a and a first negative electrode tab 15b, which are formed at one end thereof, and a second positive electrode tab 16a and a second negative electrode tab 16b, which are formed at the other end thereof. That is, the battery cell 14 according to the present embodiment may have the positive electrode tabs 15a and 16a and the negative electrode tabs 15b and 16b, which are located at both ends thereof, respectively. The first positive electrode tab 15a and the first negative electrode tab 15b, and the second positive electrode tab 16a and the second negative electrode tab 16b may be arranged in a left-right reversed form. Through this configuration, the positive electrode tabs 15a and 16a and the negative electrode tabs 15b and 16b allow a current to flow through the tabs having a short distance therebetween, such that the internal resistance of the battery cell 14 may be minimized.

The battery stack 12 may be formed by stacking the plurality of battery cells 14. In order to obtain a voltage higher than that of a single battery cell 14, the electrode tabs 15a, 15b, 16a and 16b in the battery stack 12 may be connected to each other in series by the bus bar assemblies 20 and 30. As shown in FIG. 4, the battery cells 14 may be configured so that the positive electrode tabs 15a and 16a and the negative electrode tabs 15b and 16b are alternately arranged in a stacking direction. In addition, the battery cells 14 may be stacked in a horizontal direction, that is, in the width direction of the battery module 10 to form the battery stack 12. However, the arrangement and stacking directions of the battery cells 14 are not limited thereto.

Referring to FIG. 2, the bus bar assemblies 20 and 30 may include a first bus bar assembly 20 disposed at one end of the battery module 10 and a second bus bar assembly 30 disposed at the other end of the battery module 10. The first and second bus bar assemblies 20 and 30 are disposed at one end and the other end of the battery module 10 to be spaced apart from each other, respectively, to form independent positive electrode terminals 42 and 52 and negative electrode terminals 44 and 54.

The first bus bar assembly 20 may include first bus bars and a first terminal plate 24. The first positive electrode tab 15a and the first negative electrode tab 15b located at one end of the battery stack 12 may be connected to each other in series through the first bus bars 22.

The first terminal plate 24 may be connected to the first bus bars 22 to which the first positive electrode tab 15a and the first negative electrode tab 15b are connected to form a first positive electrode terminal 42 and a first negative electrode terminal 44.

The second bus bar assembly 30 may include second bus bars 32 and a second terminal plate 34. The second positive electrode tab 16a and the second negative electrode tab 16b located at the other end of the battery stack 12 may be connected to each other in series through the second bus bars 32.

The second terminal plate 34 may be connected to the second bus bars 32 to which the second positive electrode tab 16a and the second negative electrode tab 16b are connected to form a second positive electrode terminal 52 and a second negative electrode terminal 54. The first and second positive electrode terminals 42 and 52; and the first and second negative electrode terminals 44 and 54 of the battery module 10 may be electrically connected to the terminals of another battery module adjacent thereto.

The battery module 10 has an advantage that, since all the first and second positive electrode terminals 42 and 52; and the first and second negative electrode terminals 44 and 54 are activated, when only the electrode tabs coupled to any one terminal are activated, a temperature imbalance phenomenon generated due to a concentration of the current may be minimized, and the formation of dendrite may be prevented.

In addition, the battery module 10 may operate independently with the first positive electrode terminal 42 and the first negative electrode terminal 44 as the first terminal 40, and the second positive electrode terminal 52 and the second negative electrode terminal 54 as the second terminal 50. Through this configuration, a separate configuration for electrically connecting the first and second terminals may be omitted. That is, since the configuration of directly connecting the first and second terminals can be omitted, the cooling member may be applied to at least one side surface of side surfaces forming four sides of the battery stack 12 located between the first and second terminals, or otherwise, cooling members may be applied to all the side surfaces correspond to the four sides.

Figure 6:
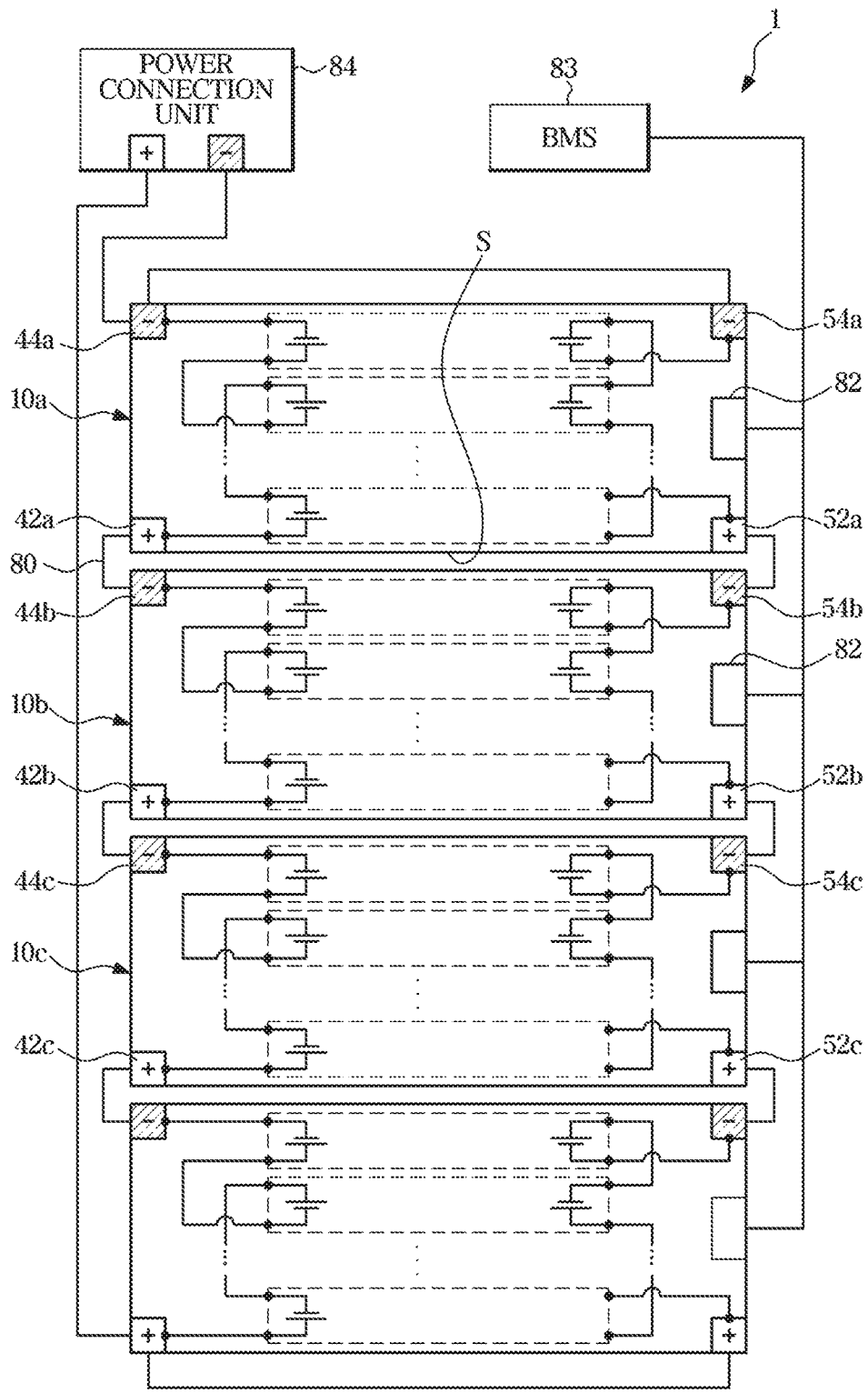
FIGS. 6 and 7 are diagrams schematically illustrating battery systems according to embodiments of the present invention.
Figure 7:
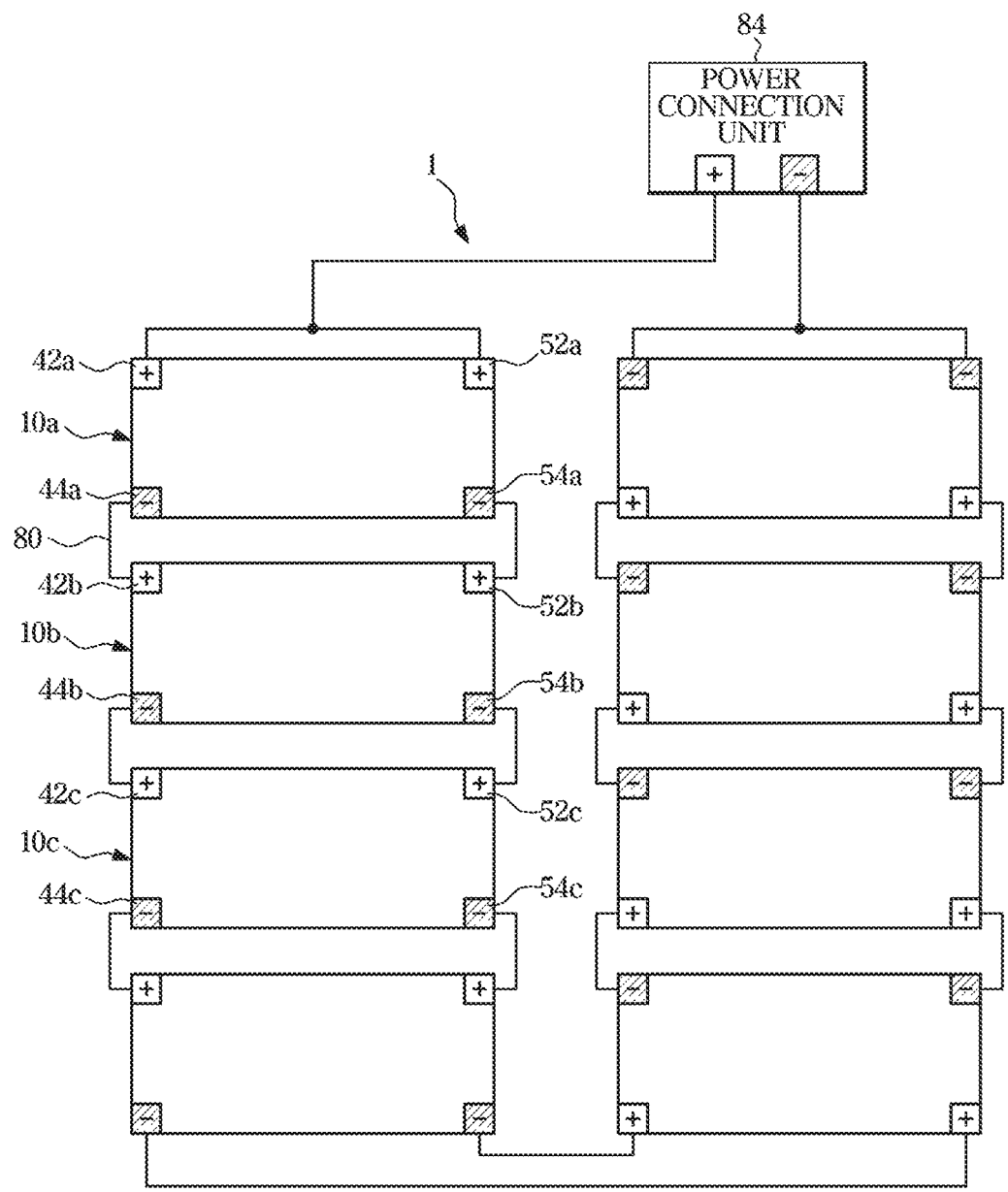

FIGS. 6 and 7 are diagrams schematically illustrating battery systems according to embodiments of the present invention.

A battery system 1 may include a plurality of battery modules 10.

As described above, the plurality of battery modules 10 may include first and second terminals 40 and 50 which are formed by connecting a first positive electrode tab 15a and a first negative electrode tab 15b at one end thereof, and a second positive electrode tab 16a and a second negative electrode tab 16b at the other end thereof to each other by bus bars 22 and 32. Through this configuration, the plurality of battery modules 10 may be electrically connected to each other.

The plurality of battery modules 10 may also be arranged in one column as shown in FIG. 6, and may also be arranged in two column as shown in FIG. 7. The arrangement of the plurality of battery modules 10 forming the battery system is not limited.

The plurality of battery modules 10 may be arranged so that module side surfaces S forming the length of the battery module 10 face each other between the first and second terminals 40 and 50. As the plurality of battery modules 10 are arranged in this way, electrical connection distances between the terminals 42, 44, 52, and 54 in the battery system 1 may be minimized.

The first and second terminals of any one battery module among the plurality of battery modules 10 may be arranged to be electrically connected to the terminals of the battery modules adjacent to the any one battery module, respectively. The electrical connection may include at least one connection of a series connection or a parallel connection. That is, in the present embodiment, the configuration, in which the plurality of battery modules 10 are connected to each other in series, has been described as an example, but it is not limited thereto. The plurality of battery modules 10 may be connected to each other in parallel.

The plurality of battery modules 10 may include first to battery modules 10a, 10b and 10c, and each of the battery modules 10a, 10b and 10c may include first positive electrode terminals 42a, 42b and 42c, respectively, first negative electrode terminals 44a, 44b and 44c, second positive electrode terminals 52a, 52b and 52c, and second negative electrode terminals 54a, 54b and 54c. It may be configured so that the first and second positive electrode terminals 42a and 52a of the first battery module 10a are connected to the first and second negative electrode terminals 44b and 54b of the second battery module 10b adjacent to the first battery module 10a, respectively, and the first and second positive electrode terminals 42b and 52b of the second battery module 10b are connected to the first and second negative electrode terminals 44c and 54c of the third battery module 10c adjacent to the second battery module 10b, respectively.

The plurality of battery modules 10 may be configured so that polarities of the first and second terminals 40 and 50 are alternately arranged in an arrangement direction. That is, in the plurality of battery modules 10, the positive electrode terminals 42 and 52 and the negative electrode terminals 44 and 54 may be alternately arranged in the arrangement direction. Through this arrangement, it is possible to minimize the electrical connection length between the terminals to be described below.

The first and second terminals 40 and 50 may be configured to operate independently with respect to the battery module 10. That is, since the first and second terminals 40 and 50 include the positive electrode terminals 42 and 52 and the negative electrode terminals 44 and 54, respectively, charging and discharging of the battery module may be accomplished only by connecting at least one terminal of the first and second terminals 40 and 50. Through this configuration, even when the electrical connection of any one terminal is disconnected, the operation of the entire battery system may not be stopped.

The battery system 1 may include a module bus bar 80.

The module bus bar 80 may be provided for electrical connection between the terminals of the battery module 10. That is, the first and second terminals 40 and 50 of the plurality of battery modules 10 may be electrically connected through the module bus bar 80. As described above, the plurality of battery modules 10 are arranged so that the module side surfaces S face each other, and the positive electrode terminals 42 and 52 and the negative electrode terminals 44 and 54 are alternately arranged in the arrangement direction, such that the length of the module bus bar 80 for electrically connecting the terminals may be minimized.

The battery system 1 may include module battery management systems (BMSs) 82. The module BMSs 82 may be connected to each of the plurality of battery modules 10 to monitor and control each battery module 10. Each module EMS monitors states of the batteries by sensing the temperature, voltage, current, and the like of each battery module 10 or battery cell 14, and transmits monitored battery status information to an outside via wirelessly or wired communication. The battery system 1 may include a system BMS 83. The status information collected by a plurality of module BMSs 82 may be transmitted to the system EMS 83.

The battery system may include a power connection unit 84.

The power connection unit 84 may have a positive electrode and a negative electrode which are connected to the first and second terminals 40 and 50 of the plurality of battery modules 10 through the electrical connection therebetween. The power connection unit 84 may be connected with a high voltage as the plurality of battery modules 10 are connected.

As such, specific embodiments of the present invention have been illustrated and described in detail. However, the present invention is not limited to the above embodiments, and it will be understood by those skilled in the art that various alterations and modifications may be implemented without departing from technical spirits of the invention described in the following claims.

DESCRIPTION OF REFERENCE NUMERALS

1: Battery system
10: Battery module
12: Battery stack
14: Battery cell
20, 30: Bus bar assembly
22, 24: Bus bar
24, 34: Terminal plate
40, 50: Terminal
42, 44: Positive electrode terminal
52, 54: Negative electrode terminal
60: Module case
62: Case body
70: Case cover
80: Module bus bar
82: Module BMS
84: Power connection unit

What is claimed is:

1. A battery system comprising
a plurality of battery modules including battery cells, the battery cells being stacked, the plurality of battery modules being sequentially connected in series; and
a power connection unit,
wherein each of the battery cells extends from an end to another end,
wherein each of the battery cells includes:
first electrode tabs having a first positive electrode tab and a first negative electrode tab, which are positioned at the end of the battery cell, and
second electrode tabs having a second positive electrode tab and a second negative electrode tab, which are positioned at the other end of the battery cell,
wherein the first positive electrode tab and the second positive electrode tab are located diagonally on the battery cell,
wherein the first negative electrode tab and the second negative electrode tab are located diagonally on the battery cell,
wherein each of the plurality of battery modules is extended in a longitudinal direction from a first end to a second end,
wherein a length of each of the plurality of battery modules in the longitudinal direction is greater than a length of each of the plurality of battery modules in a width direction,
wherein each of the plurality of battery modules comprises:
a first terminal having a first positive electrode terminal and a first negative electrode terminal, which are located at the first end, and
a second terminal having a second positive electrode terminal and a second negative electrode terminal, which are located at the second end,
wherein the plurality of battery modules includes a positive outer battery module on one end of the plurality of battery modules and a negative outer battery module on the other end of the plurality of battery modules, the positive outer battery module and the negative outer battery module are connected to the power connection unit, wherein the first positive electrode terminal and the second positive electrode terminal of the positive outer battery module are electrically connected to each other, and wherein the first negative electrode terminal and the second negative electrode terminal of the negative outer battery module are electrically connected to each other.

2. The battery system according to claim 1, wherein the first and second terminals are configured to operate independently.

3. The battery system according to claim 1, wherein the plurality of battery modules are configured so that polarities of the first and second terminals are alternately arranged in an arrangement direction of the plurality of battery modules.

4. The battery system according to claim 1, wherein each of the plurality of battery modules comprises:

a first bus bar assembly having first bus bars to which the first electrode tabs of the battery cells are connected, and a first terminal plate which is electrically connected to the first bus bars to form the first positive electrode terminal and the first negative electrode terminal; and a second bus bar assembly having second bus bars to which the second electrode tabs of the battery cells are connected, and a second terminal plate which is electrically connected to the second bus bars to form the second positive electrode terminal and the second negative electrode terminal.

5. The battery system according to claim 4, wherein the first and second bus bar assemblies are located at the first end and the second end of the battery module, respectively.

6. The battery system according to claim 1, wherein the width direction is perpendicular to the longitudinal direction.

7. The battery system according to claim 6, wherein the plurality of battery cells are disposed to be stacked in the width direction.

8. The battery system according to claim 1, wherein first and second positive electrode terminals of a first battery module among the plurality of battery modules are respectively connected to first and second negative electrode terminals of a second battery module adjacent to the first battery module, and first and second positive electrode terminals of the second battery module are respectively connected to first and second negative electrode terminals of a third battery module adjacent to the second battery module.

9. The battery system according to claim 1, wherein the first and second terminals of one battery module of the plurality of battery modules are electrically connected with the first and second terminals of battery modules adjacent to the one battery module, wherein the first positive electrode terminal, the first electrode tabs of the plurality of battery cells, and the first negative electrode terminal are electrically connected in series, and wherein the second positive electrode terminal, the second electrode tabs of the plurality of battery cells, and the second negative electrode terminal are electrically connected in series.

10. The battery system according to claim 1, wherein the first positive electrode terminal and the first negative electrode terminal of the first terminal and the second positive electrode terminal and the second negative electrode terminal of the second terminal are symmetrically disposed with respect to a longitudinal center of each of the plurality of battery modules.

* * * * *